United States Patent Office 3,086,570
Patented Apr. 23, 1963

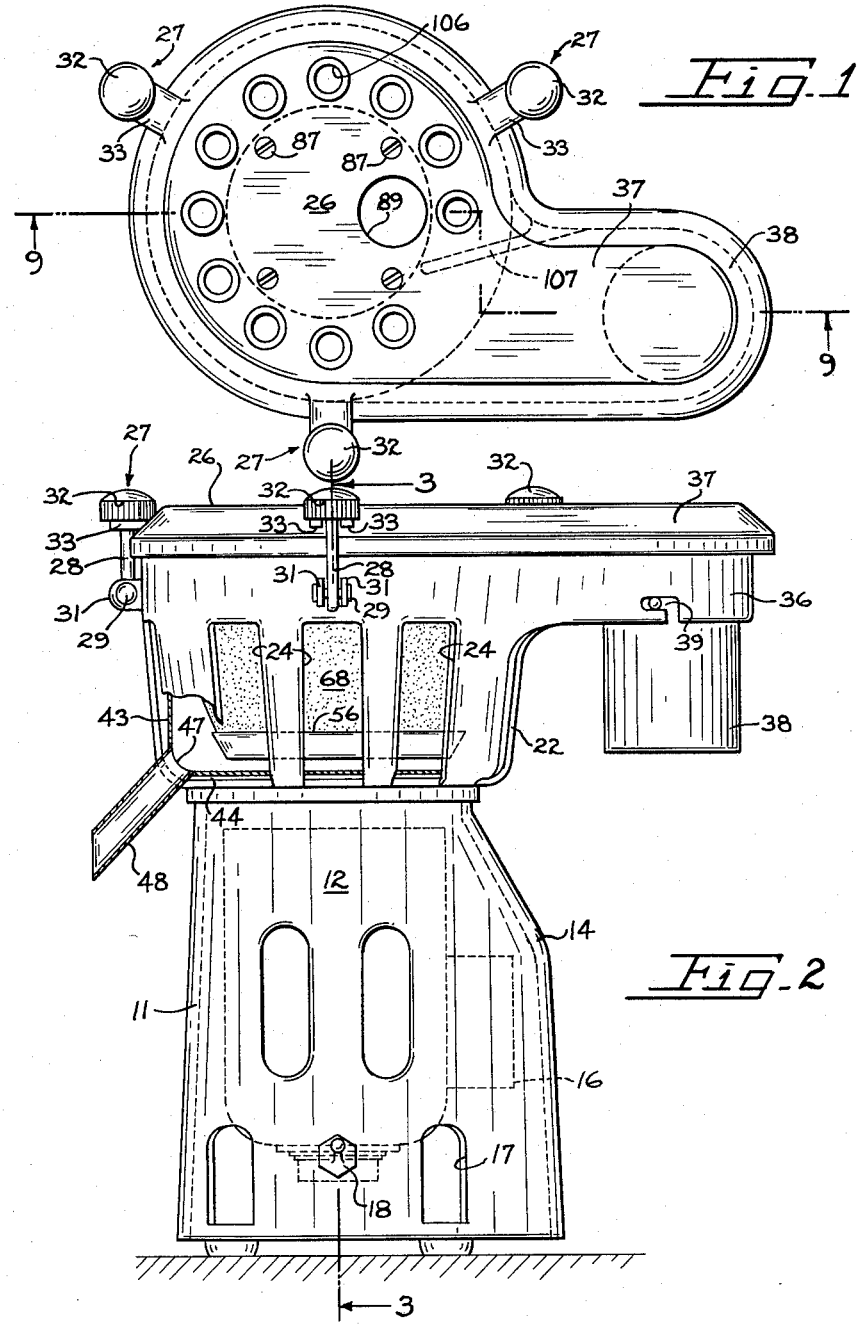

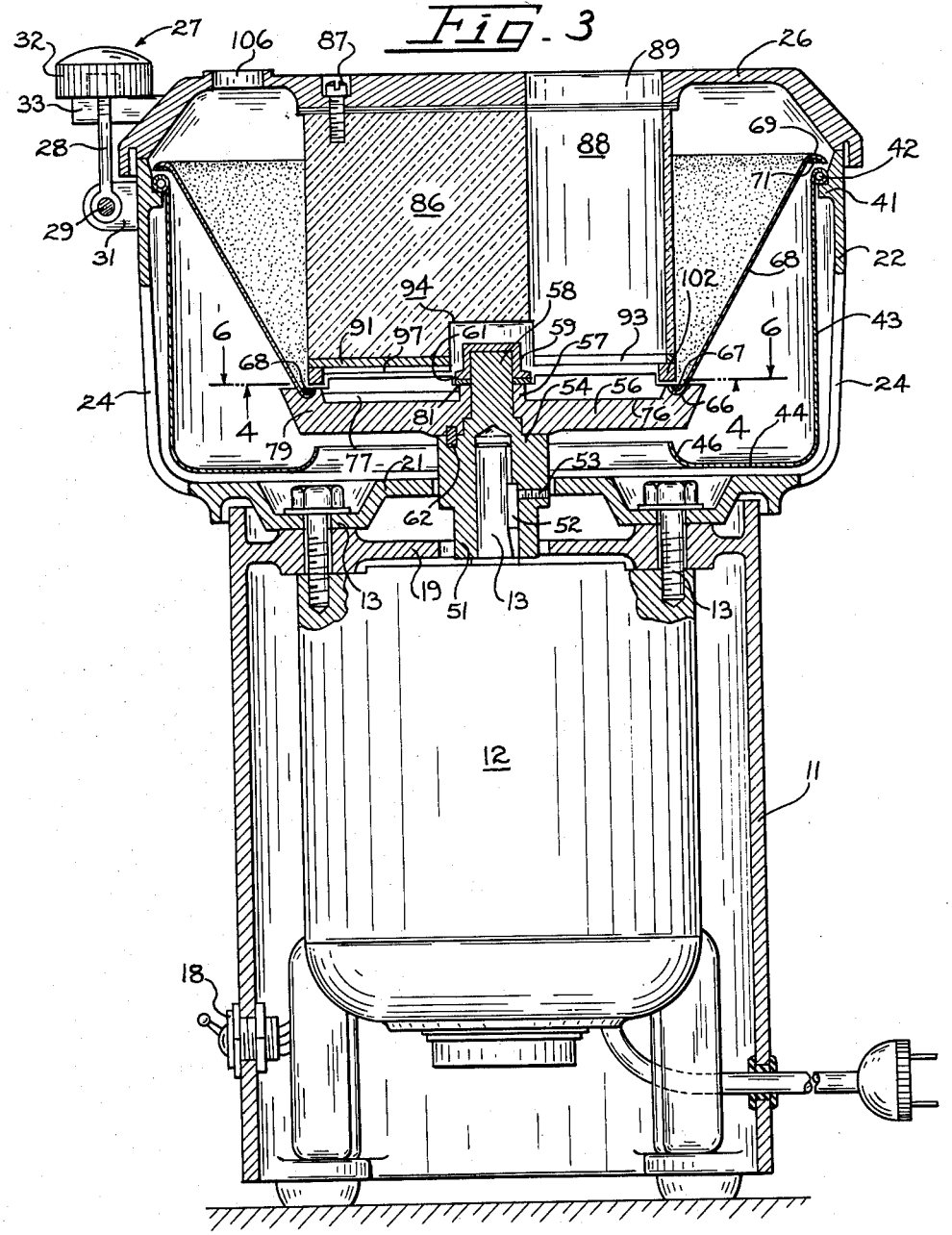

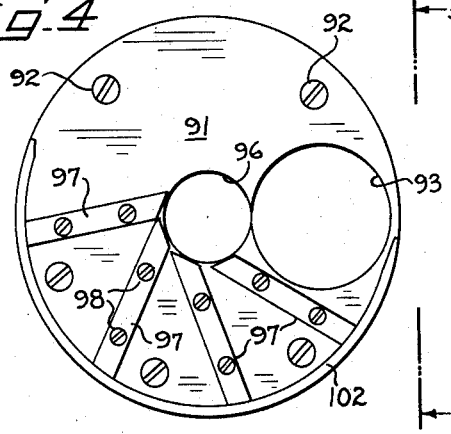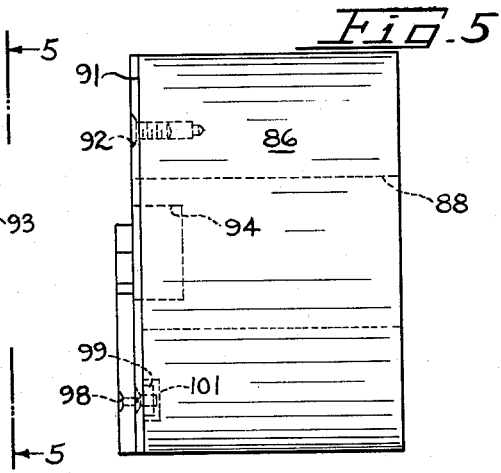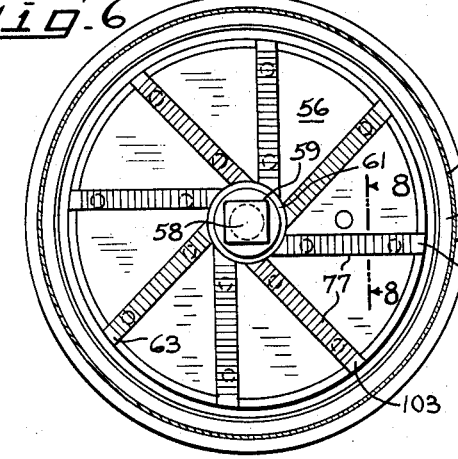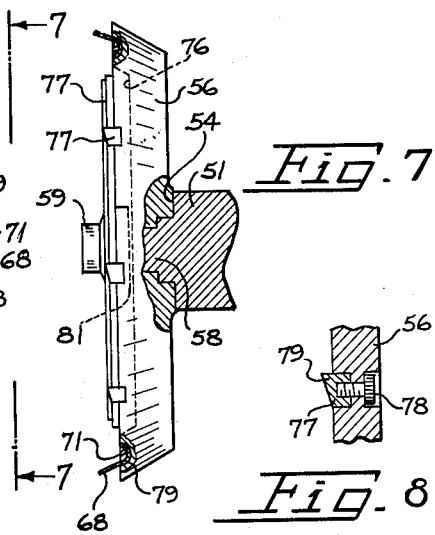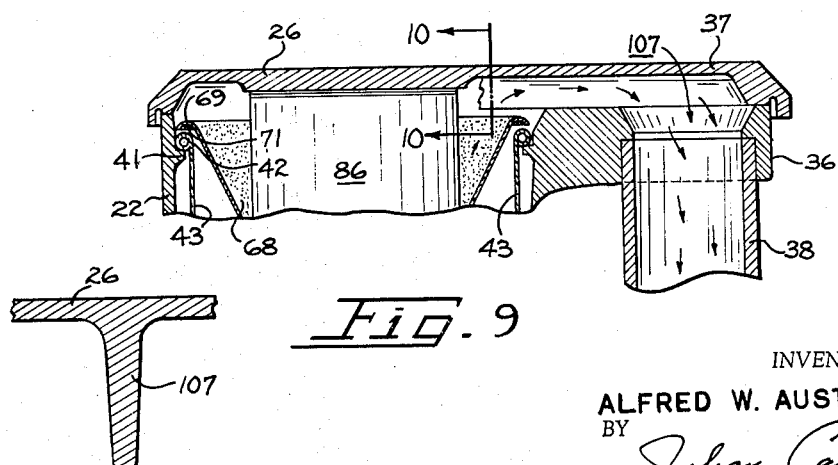

3,086,570
VEGETABLE AND FRUIT JUICE EXTRACTING MACHINE
Alfred W. Austad, % Vitality Health Food Shop, 945 Market St., San Francisco, Calif.
Filed June 19, 1962, Ser. No. 203,510
10 Claims. (Cl. 146—76)

This invention relates to a new and improved vegetable and fruit juice extracting machine. More particularly, the invention relates to a machine which is electrically-driven and which receives raw vegetables or fruit, comminutes the material, strains the juice from the comminuted pulp and deposits the juice and pulp in separate receptacles.

The principal feature and advantage of the present invention is the improvement in the means whereby the material is comminuted, said means employing horizontally-disposed cutting elements, one set of elements rotating in close proximity to a stationary set of elements. The material is fed into the space between the cutting elements and carried around between same. Centrifugal force throws the juice and pulp against a screen, the juice passing through the screen and into a trough which leads to a discharge spout, the pulp being carried up over the side of the screen and into a discharge chute.

A still further feature of the invention is the simplicity of construction of the aforesaid elements and, more particularly, of the screen and its mounting. The simplicity of construction reduces the cost of manufacture and the maintenance thereof. In addition, the simplicity of construction facilitates cleaning the apparatus.

Still another feature of the invention is the fact that the cover of the machine is vented so that tendency of a vacuum to build up in the narrow space beween the cutting elements and the screen and its surrounding plug is overcome thereby enabling the device to discharge juice and pulp with facility.

A further feature of the invention is the ease with which the parts may be assembled and disassembled.

A further feature and advantage of the invention is the fact that a richer juice is produced because more of the pulp of the vegetables and fruit is dispersed therein. The height of the cutter blades used to mascerate the material is about twice the diametere of the holes in the straining basket, a feature which promotes greater dispersion of the pulp in the juice and increases the richness thereof.

A still further feature of the invention is the fact that ejection of the pulp is more efficient, a result which is obtained by venting air into the space between the rotating parts of the machine and, further, by providing a deflecting plate which directs the pulp back into the basket for recirculation through the mascerating blades.

A still further feature of the invention is the mounting of cutter blades in blade holders for both the upper and lower blades. This permits the use of hardened, stainless steel cutters which are sharp and efficient and long-wearing. Further features of the mounting of the cutter blades insure that they are sealed in grooves in their holders and fastened from the underside so that they cannot be dislodged.

Another feature of the invention is the provision of the rim around the blades to retain certain vegetable pulp in contact with the upper plate holding the upper cutter bars. Such retaining ring results in more efficient pulping of material such as parsley and cabbage, products which have not heretofore been efficiently handled by machines of this general type.

Still anothere feature of the invention is the shape of the strainer basket which is conical and thus results in a uniform, upward, outward movement of the pulp, preventing the pulp from building up in pockets and eliminating vibration and noise from unequal distribution of pulp around the rotating parts.

A further feature of the invention is in the construction of the strainer or basket separating juice and pulp. The conical side of the basket is made of perforated metal screen. Both top and bottom edges of the metal are curled and the curl filled with an epoxy resin which tends to make the edges rigid and conforming to a circle yet preserves flexibility in the screen itself. The lower edge of the basket is received in a groove in a metal base, the resin performing the further function of cementing the screen in the base.

A particular advantage of the machine is its freedom from intense vibration. Previous machines of this general type tend to vibrate excessively, particularly if deposits of pulp are built up unevenly on the screen. The present machine is well balanced and the balance is maintained to a considerable degree despite uneven load around the rotating parts.

Other objects of the present invention will become apparent upon reading the following specification and referring to the accompanying drawings in which similar characters of reference represent corresponding parts in each of the several views.

In the drawings:

FIG. 1 is a top plan of the machine.

FIG. 2 is a side elevation thereof.

FIG. 3 is a vertical, sectional view taken substantially along the line 3—3 of FIG. 2, the said view being enlarged.

FIG. 4 is a horizontal, fragmentary sectional view taken substantially along the line 4—4 of FIG. 3.

FIG. 5 is a side elevational view of the structure of FIG. 4 as viewed along the line of 5—5 of FIG. 4.

FIG. 6 is a horizontal, sectional view taken substantially along the line 6—6 of FIG. 3.

FIG. 7 is a fragmentary, side elevational view as viewed substantially along the line 7—7 of FIG. 6.

FIG. 8 is a fragmentary, sectional view showing the means whereby the cutting elements of FIG. 6 are secured in place as indicated by arrows 8—8 of FIG. 6.

FIG. 9 is a fragmentary, vertical sectional view taken substantially along the line 9—9 of FIG. 1.

FIG. 10 is an enlarged, fragmentary sectional view taken substantially along the line 10—10 of FIG. 9.

The machine which is the subject of the present invention comprises a lower base 11 which encloses electric motor 12 having a vertically-upwardly extending motor shaft 13. Lower base 11 has a laterally-offset boss 14 to accommodate capacitor 16. Suitable vents 17 are formed in base 14 to ventilate motor 12. Electric switch 18 is located on the base 11 to control operation of motor 12. The upper end of lower base 11 is closed off by a horizontal flange 19 on which is supported the lower horizontal flange 21 of upper base member 22. Bolts 23 secure the upper and lower base members 22 and 11, respectively, in position. Vents 24 are also formed in upper base 22. Upper base 22 is open at the top and a closure is provided in the form of cover 26. Cover 26 is removable and to facilitate attachment and detachment of cover 26 there are provided latch members 27. Latch members 27 comprise screws 28 attached at their lower ends by pivots 29 to clevis members 31 on base 22. Nuts 32 are threaded on the upper ends of screws 28 and rest upon bifurcated projections 33 on cover 26. By loosening nuts 32 the screws 28 may be swung down out of engagement with members 33, thereby permitting lifting of cover 26. When the cover 26 is replaced, screws 28 are swung up into upwardly-vertically extending position and nuts are tightened against projections 33, thereby securing cover 26 in place. Upper base 22 has a laterally offset extension 36 and cover 26 has an overlying extension 37 which project out beyond the outline of base 11 and boss 14. A pulp discharge tube 38 projects down from extension 36 and is secured thereto by a bayonet slot connection indicated generally by reference numeral 39.

The upper end of base 22 has an inwardly projecting ledge 41 on which rests bead 42 on the upper end of cup 43 which fits inside upper base 22. The lower end of cup 43 has an inwardly-horizontally projecting annular bottom 44 which merges at its inner edge in an upwardly-projecting rim 46. At one point in the bottom 44 at the corner where it joins cup 43 is a hole 47 which provides access to a downwardly-slanted tube 48 through which juice discharges into a suitable receptacle (not shown). Tube 48 projects through any of vents 24 so that the discharge may be in any direction relative to the machine.

Both flanges 19 and 21 are centrally apertured to provide a clearance for fitting 51 which is mounted on the upper end of motor shaft 13 by means of key 52 and set screw 53. Fitting 51 has a horizontal shoulder 54 on which rests horizontal basket base 56. Base 56 has an integral collar 57 through which projects the threaded upper end 58 of fitting 51. A stop nut 59 with nylon-impregnated threads is threaded onto end 58 and is provided with an underlying flange 60 and washer 61 which bear against collar 57 and hold base 56 secured to fitting 51 and thus to shaft 13. A pin 62 is imbedded in fitting 51 and projects up above shoulder 54 and is received in a suitable hole in base 56 so that base 56 rotates with shaft 13.

A shallow annular depression 66 is formed adjacent the periphery of basket base 56. Depression 66 receives the inwardly-turned bead 67 on the bottom edge of conical screen or basket 68 and said bead 67 is filled with an epoxy resin which cements the lower edge of basket 68 to base 56. The outer or upper end of basket 68 is formed with an outwardly and downwardly turned bead 69 which is also filled with an epoxy resin 71 to rigidify the same. Basket 68 provides a screen to separate juice from pulp, as hereinafter explained. Positioned in a depression 76 in the upper surface of base 56 is a plurality of lower cutting elements 77 formed with transverse serrations 75.

Cutting elements 77 are located tangential to a small diameter circle central of base 56. Thus, as best shown in FIG. 6 there are eight cutting elements 77 located substantially equally spaced around base 56, each element 77 being parallel to a radius of base 56 but offset slightly therefrom. Screws 78 extend through the bottom of base 56 and are threaded into the bottom of elements 77, there being two screws 78 for each element 77. The outer ends of cutting elements 77 are restrained from outward movement from the upwardly-slanted rim 79 of base 56. The upper edges of cutting elements 77 are slanted to provide rake in the direction of rotation of base 56 so that the leading corner edges 79 serve as cutting edges. The inner ends of cutting elements 77 are formed with shoulder 81 on which seats washer 61. Hence washer 61 assists in holding cutting elements 77 in position.

Depending from cover 26 is a central, substantially cylindrical plug 86 secured to cover 26 by screws 87. Plug 86 is provided with a laterally offset hole 88 which is aligned with a similar hole 89 in cover 26 so that vegetables and fruits may be inserted through holes 89 and 88 and into the machine. On the lower end of plug 86 is a plate 91 which is secured thereto by screws 92 and is likewise formed with an aperture 93 aligned with hole 88. Recess 94 in the bottom of plug 86 receives nut 59 and shaft end 58. For such purpose plate 91 is formed with an aperture 96. On the lower surface of plate 91 are fixed four upper cutting elements 97 which are secured thereto by screws 98 and nuts 99 which are received in recesses 101 in plug 86. The four cutting elements 97 are disposed tangential to a small diameter circle concentric with the axis of plug 86. The elements 97 are positioned equally angularly spaced behind aperture 93 in the direction of rotation of base 56 for an arcuate distance of approximately 180°. The position of such elements 97 is best shown in FIG. 4. Elements 97 are approximately rectangular in cross-section. Rim 102 having an arcuate length of slightly greater than 180° is formed on the periphery of plate 91 to retain and more efficiently pulp materials, such as parsley and cabbage, which are difficult to extract with other equipment. The outer ends of lower cutting elements 77 are depressed as indicated by reference numeral 103 to accommodate rim 102.

For more efficient operation of the device, the cover plate 26 is formed with a plurality of vent holes 106 in the top thereof, there being eleven such holes located immediately outside the diameter of plug 86. Further, the underside of the cover plate 26 is formed with a baffle 107 tending to deflect pulp thrown upwardly against the underside of cover 26 back on to basket 68. As best shown in FIG. 1 the deflector baffle 107 is so positioned as to deflect pulp tending to travel into the extension 37 of the cover 26 which leads to discharge duct 38.

Another feature of the invention is the fact that the height of the cutter blades 97 above plate 91 and of cutters 77 above base 56 is approximately equal twice the diameter of the holes in the screen of basket 68, this dimension being approximately 0.025 inch. The formation of basket 68 without a distortion of the screen is such as to maintain uniform diameter of the holes. The sides of the basket 68 slant upwardly at a straight line in cross-section so as to obtain uniform, upward and outward movement of the pulp, preventing the pulp from building up in pockets and eliminating vibration and noise in the machine due to uneven distribution of pulp in the rotating part.

What is claimed is:

1. A juice extracting machine comprising a frame having an open top, a lateral offset for said frame, a pulp discharge duct extending from said offset, an apertured cover for said top and offset, a motor mounted in said frame having a shaft extending upward toward said cover, a cup mounted in said frame above said motor and receiving the upper end of said shaft, a discharge spout connected to said cup and extending exteriorly of said frame for discharge of juice, a basket base mounted above said cup for rotation with said shaft, a basket screen on said basket base sloping upwardly-outwardly to the upper edge of said cup, said basket base having a substantially flat top surface transverse to said shaft, a plurality of bottom cutter blades mounted on said top surface, a cylindrical plug depending from said cover and having a bottom surface parallel to and spaced from said top surface, said plug apertured in registry with the aperture in said cover for insertion of vegetable matter from outside said cover into the space between said top and bottom surfaces, a plurality of top cutter bars mounted on said bottom surface in proximity to said bottom cutter bars, whereby said motor revolves said basket base, basket and bottom cutter bars to mascerate vegetable matter between said top and bottom cutter bars and juice and pulp are strained by said screen, the juice falling into said cup and discharging through said spout, the pulp being carried up over said cup into said offset and out through said duct.

2. A machine according to claim 1, in which each said cutter bar lies along a chord and tangent to a small diameter circle concentric with said shaft.

3. A machine according to claim 1, in which said screen is shaped as a straight-sided cone.

4. A machine according to claim 1, in which said basket base is formed with an annular groove near its periphery and said screen is formed with a curl along its bottom edge fitting into said groove and a first deposit of cementitious material fills said groove.

5. A machine according to claim 4, in which the upper edge of said screen is formed with a peripheral outward second curl and a second deposit of cementitious material fills said second curl to rigidify said screen.

6. A machine according to claim 1, in which said top and bottom surfaces are formed with upstanding peripheral ridges outside the outer ends of said cutter blades to retain pulp in contact with said top surface for more effective masceration of the pulp.

7. A machine according to claim 1, in which said frame is formed with a plurality of vents around its periphery, said cup being rotatable inside said frame, whereby the position of said cup may be adjusted to extend said spout through any of said vents.

8. A machine according to claim 1, in which said cover is formed with a baffle depending from the underside of said cover into the path of pulp from said basket to said lateral extension to redirect pulp back onto said basket.

9. A machine according to claim 1, in which said cover is formed with a plurality of air holes into the interior of said basket to maintain pulp in contact with said basket.

10. A machine according to claim 1, in which each cutter bar is formed of a discrete hardened stainless steel element.

No references cited.